W. W. MACFARREN.
FLUID PRESSURE ENGINE
APPLICATION FILED JUNE 8, 1908

1,116,346

Patented Nov. 3, 1914.
7 SHEETS—SHEET 1.

WITNESSES
Chas. Fosterman
Estelle M. Johnson

INVENTOR
Walter W. Macfarren

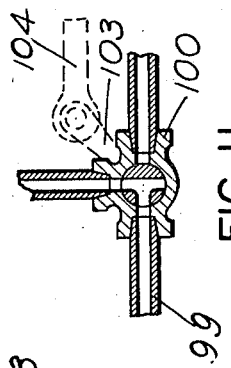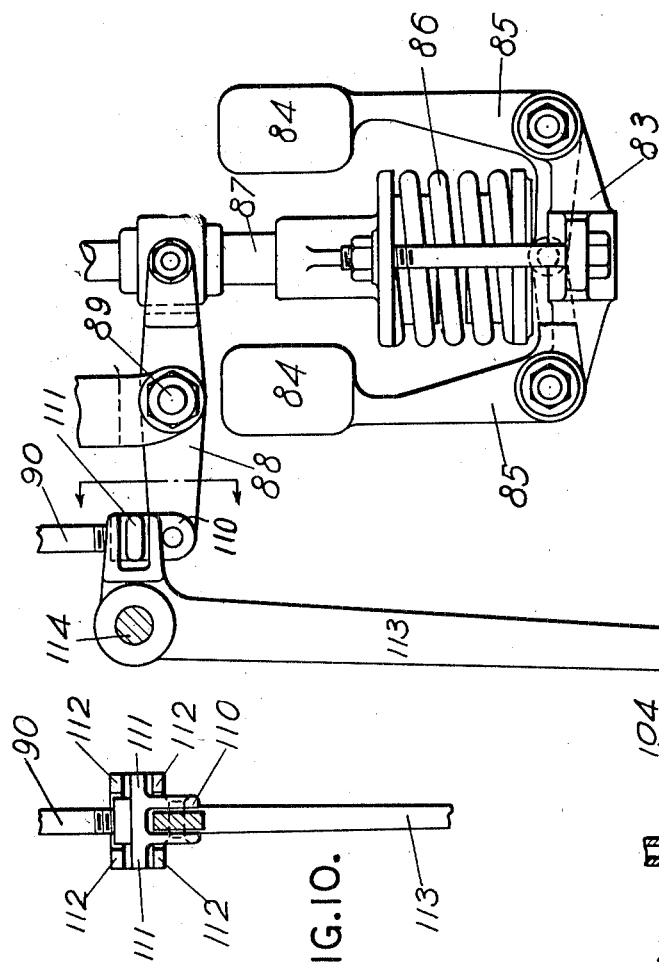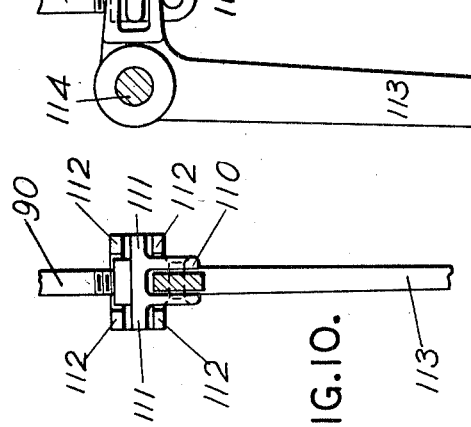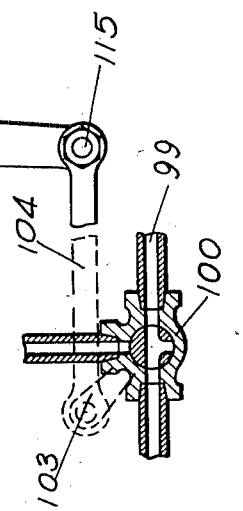

UNITED STATES PATENT OFFICE.

WALTER W. MACFARREN, OF PITTSBURGH, PENNSYLVANIA.

FLUID-PRESSURE ENGINE.

1,116,346.   Specification of Letters Patent.   Patented Nov. 3, 1914.

Application filed June 8, 1908. Serial No. 437,391.

*To all whom it may concern:*

Be it known that I, WALTER W. MAC-FARREN, a citizen of the United States, residing at Pittsburgh, in the county of Allegheny and State of Pennsylvania, have invented a new and useful Improvement in Fluid-Pressure Engines, of which the following is a specification.

My invention is applicable to stationary, marine, or locomotive engines, using steam or compressed air as a working fluid. It can be applied to any fluid pressure engine working under variable loads, in which the fluid pressure is generated outside of the working cylinder and used expansively therein. Certain of the mechanical features are also applicable to other types of engines.

The specific object of my invention is to obtain complete expansion of the working fluid at each stroke of the piston, so that all the elastic force of the propelling fluid is utilized.

As all air and most steam engines exhaust into the atmosphere, I will describe my invention as obtaining expansion practically to atmospheric pressure, but it will be understood that in the case of a condensing steam engine, exhausting into a partial vacuum, the expansion can be carried to that point, or if for any reason it is desired to exhaust against a pressure above atmosphere this can be done with equal facility; in fact, the most economical point of cut-off can be obtained and automatically maintained to suit the condition of operation.

As the governing of steam and compressed air engines is similar in principle a description of my improved mechanism as applied to steam engines will also cover its use as applied to compressed air engines; the only difference being those inherent in the two fluids, requiring different points of cut-off to obtain complete expansion, as is well understood by engineers and others versed in the art.

Figure 1:
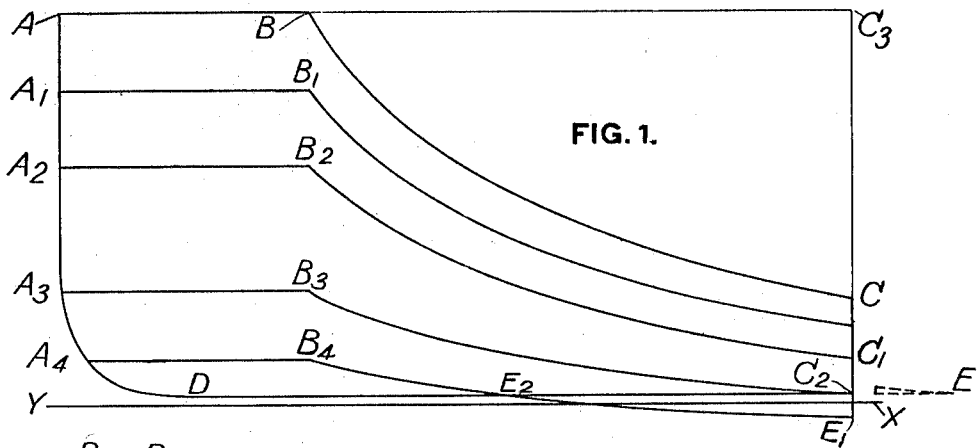
Figure 2:
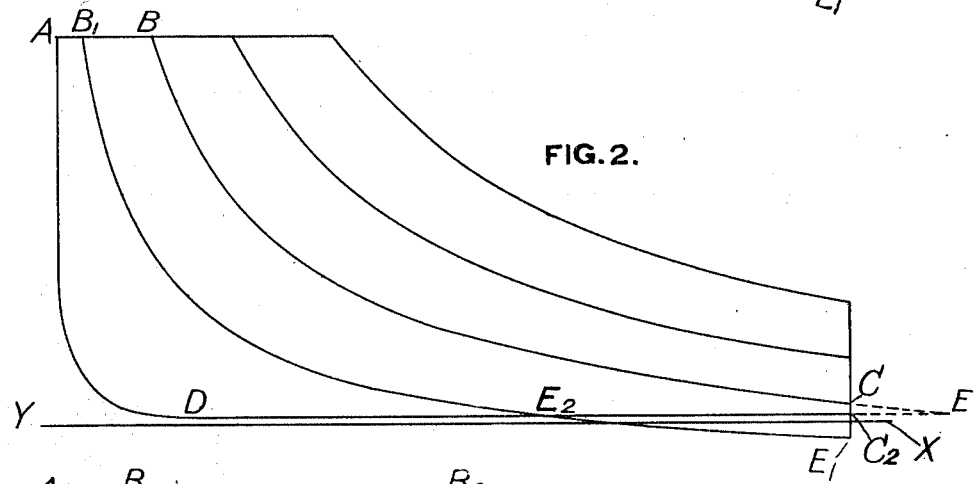
Figure 3:
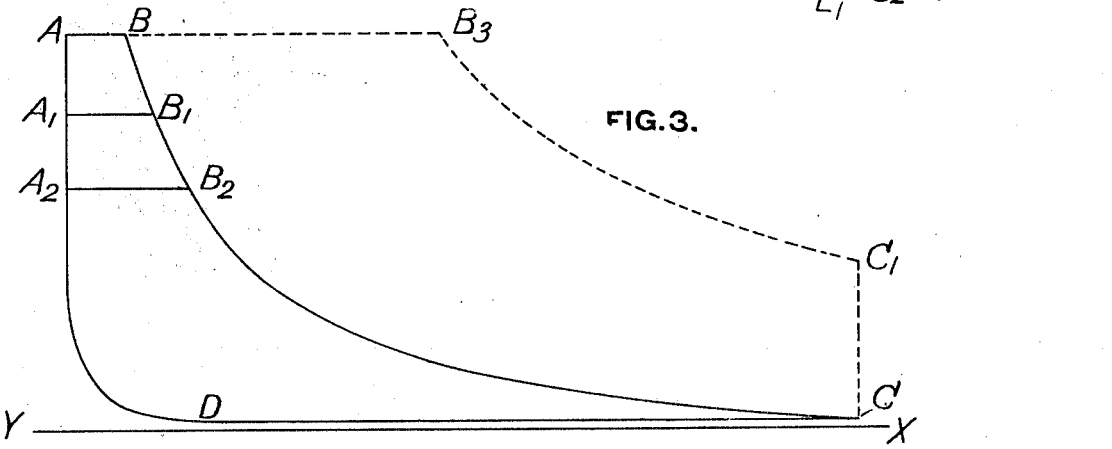
Figure 4:
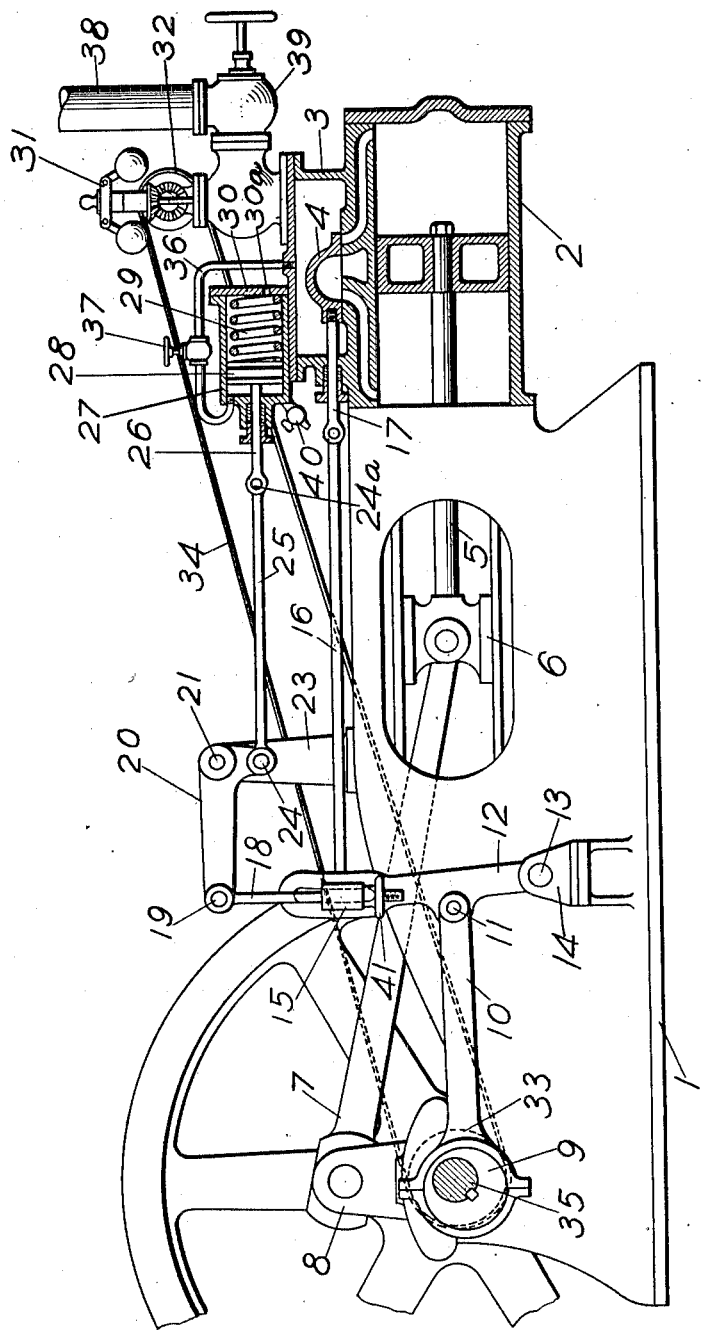
Figure 5:
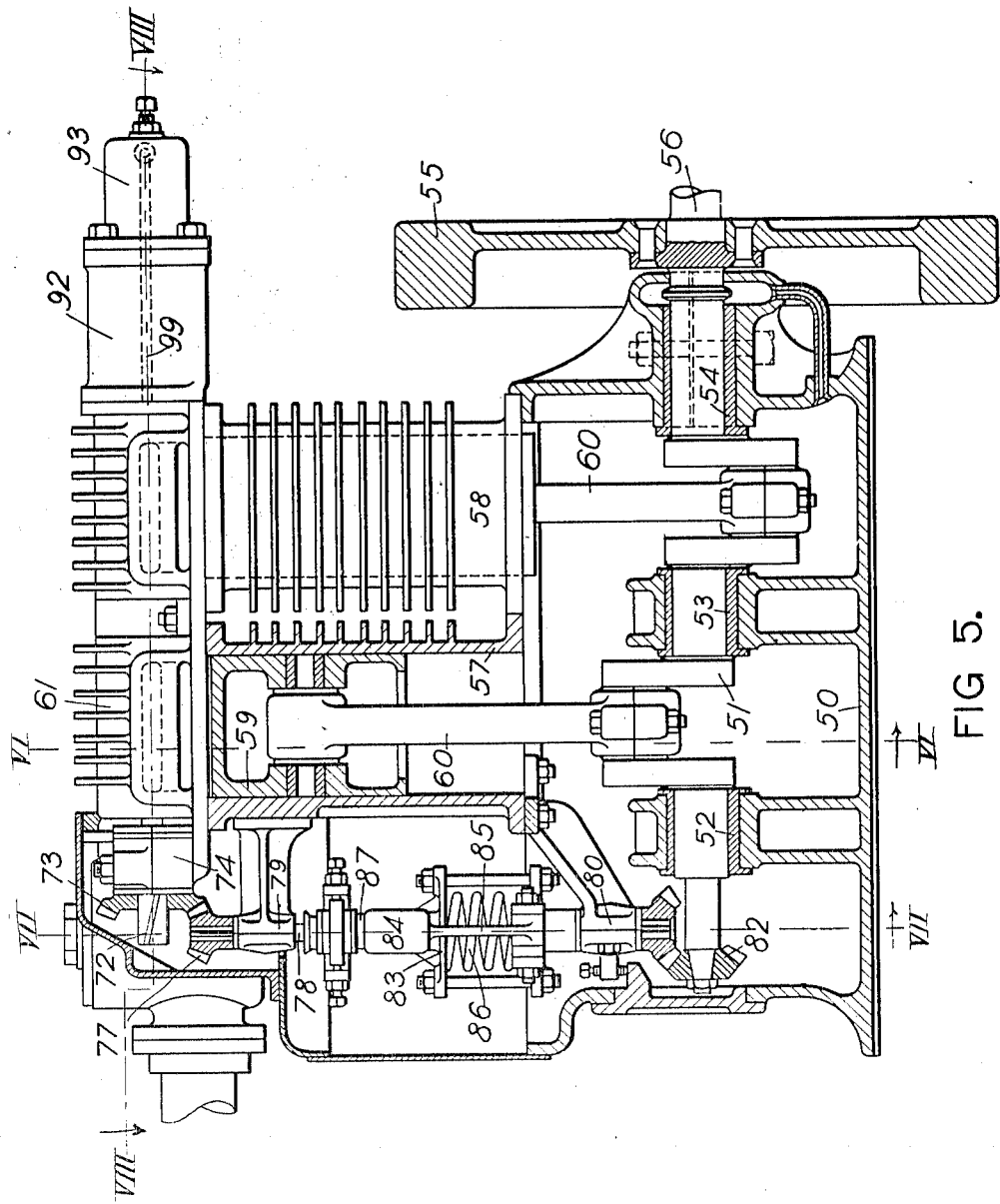
Figure 6:
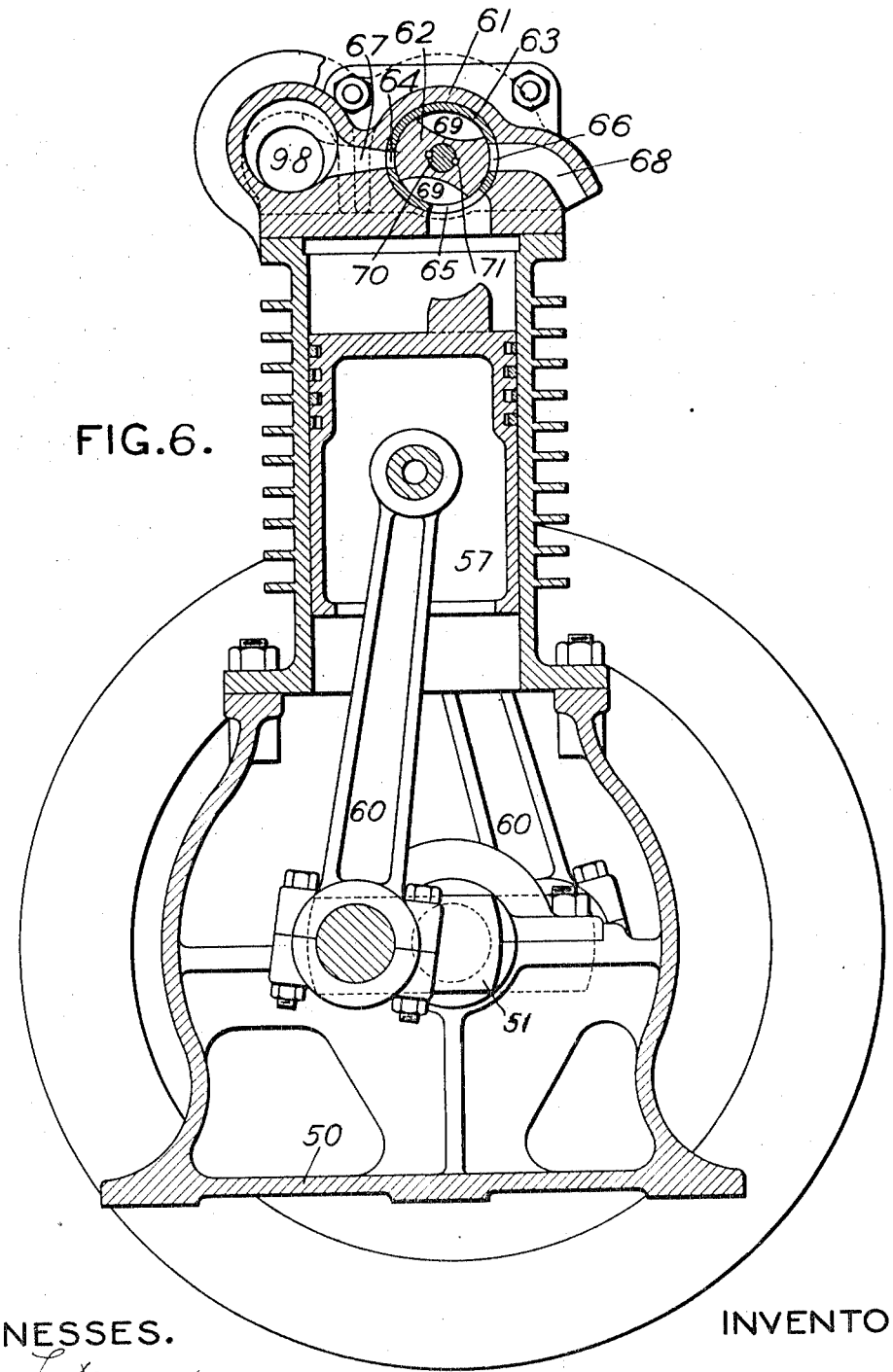
Figure 7:
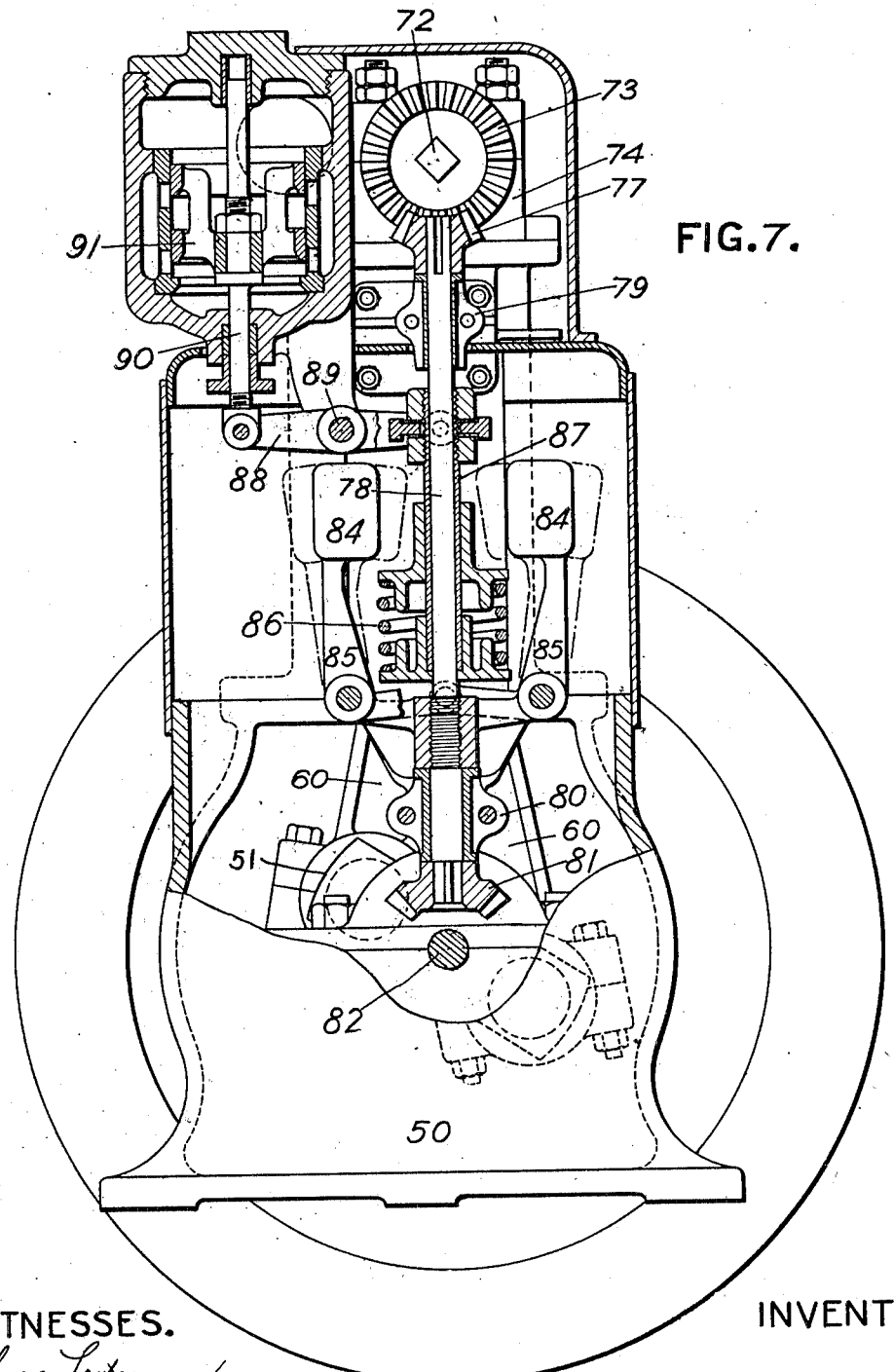
Figure 8:
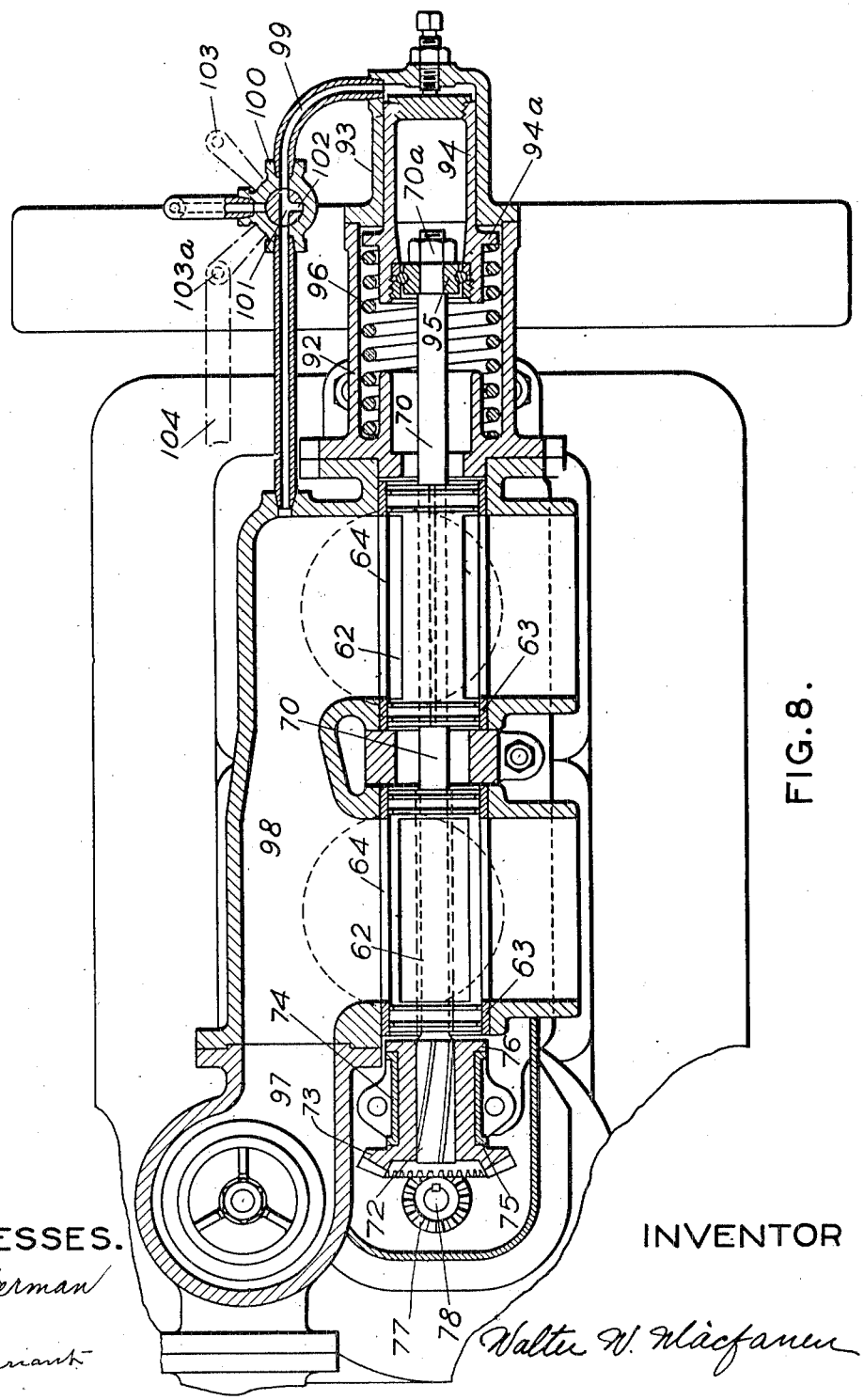

In the accompanying drawings Figure 1 is a diagram of a card produced by an engine governed by throttling the entering steam pressure and having a fixed cut-off; Fig. 2 is a similar card produced by an engine working under uniform steam pressure with a varying cut-off; Fig. 3 is a similar card produced by an engine embodying my invention; Fig. 4 is a side view, partly in section, of a steam engine of common form embodying my invention; Fig. 5 is a side elevation partly in section of a practical compressed air motor, embodying my invention; Fig. 6 is a sectional elevation of the same on the line VI—VI of Fig. 5; Fig. 7 is in part an end view and in part a vertical section of the same motor on the line VII—VII of Fig. 5; Fig. 8 is a horizontal section taken through the valve casing of said motor on the line VIII—VIII of Fig. 5; and, Figs. 9, 10, 11 are detailed views showing an automatic means for shifting the control valve.

In the earlier days of steam engineering the method of governing in common use was by throttling the pressure of the steam entering the cylinder, either by hand or by a throttling governor, and both these methods are in extensive use at the present time. This method is illustrated by Fig. 1 which represents an indicator card, approximately such as would be produced by such an engine. XY is the atmospheric line. Ordinates to this line represent pressures above atmosphere, or "gage pressure", and abscissæ measured parallel to XY represent portions of the stroke, the whole stroke being measured by $AC^3$. The point of cut-off in such engines is usually fixed, as at B. The method of governing is, as follows: Steam at the pressure AY is admitted at full pressure up to the point B and there cut-off, from which point it expands usefully (that is producing power) to the point C, when the exhaust valve opens and the remaining steam is discharged. In some cases this steam is used for other purposes, such as heating, drying, etc., but usually it escapes directly into the air and is lost. The outline A B C $C^2$ D A represents work and the additional work which could have been obtained from the same cylinder full of steam is shown comparatively by the dotted area $C^1$ E $C^2$. This represents work lost by incomplete expansion. As the load on the engine varies the governor will automatically reduce the pressure of the steam to the points $A^1$, $A^2$, $A^3$, $A^4$, etc., and produce the various cards indicated at $A^1$, $A^2$, $A^3$, etc. The card $A^4$ $B^4$, $E^2$ $E^1$ $C^2$ D $A^4$ shows the expansion carried below atmosphere, producing the negative loop $E^2$ $C^2$ $E^1$. This is to be subtracted from the positive end of the card to obtain the net work.

In Fig. 2, is illustrated the method of governing by varying the point of cut-off.

as extensively used in a class of engines known as automatic cut-off engines. These engines are universally controlled by a governor mechanism, usually complicated, which actuates the valve gear to change the point at which the valve cuts off the supply of steam. In this case a more or less uniform steam pressure is maintained in the steam chest and the amount of work done by the engine is determined by the conditions shown by the various indicator diagrams in Fig. 2, all of which is understood in the art. It will be observed that a very early cut-off, as at $B^1$ will produce a card with a negative loop, as before indicated for the throttling governor.

It will be seen from an inspection of Figs. 1 and 2 that an engine working under variable loads can only work with maximum economy (considering pressure only) when the point of cut-off is such that expansion is carried to the back pressure or nearly so. With steam, the condensation, reëvaporation and other thermal changes occurring in the cylinder render it more or less impossible to state accurately just what the most economical conditions of operation are, but it will be evident from the foregoing, that with either of the methods above described for governing, there will be a certain cut-off or pressure that will be most economical in the use of steam; that is, the work obtained from a unit of steam at this cut-off or pressure will be a maximum and consequently that all other points of cut-off or amounts of pressure will be comparatively uneconomical. For compressed air motors the conditions may be stated more definitely. To obtain maximum economy in an air motor, the point of cut-off must be varied in exact relation to the pressure so that expansion may always be carried just to atmosphere. The speed may be fully controlled, either by varying the cut-off or by throttling; but either changing the point of cut-off with a fixed initial air pressure or throttling the air with a fixed point of cut-off is wasteful. For instance, with air at 100 lbs. gage pressure the most economical point of cut-off is about $\frac{1}{4}$ of the stroke; a later cut-off will exhaust above atmosphere and waste pressure directly; and an earlier cut-off will produce a negative loop and back pressure. With any fixed cut-off there is only one initial pressure just suited to that cut-off; a higher pressure will exhaust above atmosphere and a lower pressure will produce the negative loop and back pressure as before. My invention consists therefore, in devices for varying the point of cut-off and the pressure simultaneously and in such relation to each other that the most economical rate of expansion may be practically constantly maintained over wide variations in load. The cards produced by this method of governing are illustrated approximately in Fig. 3. Fluid of pressure AY is admitted up to the point B and there cut-off and allowed to expand practically to atmospheric pressure at C. The work done is represented by the area A B C D A and is practically all the work which can be obtained from the given amount of fluid and represents the maximum power which can be developed in the cylinder at maximum economy. If less power is required the pressure is reduced by a throttling governor or a throttle valve to $A^1$ and the point of cut-off automatically adjusted to the point $B^1$, which brings the expansion line down to C as before. The card $A^2$ $B^2$ C D $A^2$ is similarly produced. In all cases the expansion is automatically carried to atmosphere or to some other predetermined point of greatest economy. It will be noted that such an engine would have a practically silent exhaust, and generally the more noise the exhaust from a steam engine makes, the more steam it is wasting. It will also be noted that in an engine governed as just described, the usual conditions are reversed and the earliest cut-off gives maximum power and vice versa. In practice it will be quite easy to design controlling elements and valve gears which will produce maximum economy over a range of load from full load to $\frac{1}{2}$ or $\frac{1}{3}$ load. As a further desirable feature it is possible to work the engine at an overload considerably over the economical maximum, at a sacrifice of efficiency. For instance, in an air motor, with 3% clearance, which would develop 50 H. P. at $\frac{1}{4}$ cut-off with 100# of air pressure, and 30 H. P. with .44 cut-off and 40# air pressure, if the full 100 lbs. of air be allowed to work at .44 cut-off the power developed at the same speeds would be 75 H. P. or an overload capacity of 50%.

Having now disclosed the principle of my invention, I will describe means for obtaining these results in practice.

Fig. 4 shows a steam engine of common form having a plain D slide valve. The bed plate or frame is indicated by the numeral 1, the cylinder by 2, the steam chest by 3, and the valve by 4. The piston rod, crosshead, connecting rod and crank are indicated at 5, 6, 7 and 8 respectively. The eccentric 9 is connected by the rod 10 and pin 11 to the slotted lever 12 which is mounted at its lower end on a pin 13 supported by the bracket 14 bolted to the frame 1. The slot in lever 12 contains a block 15 which imparts motion to a link 16, which works the valve stem 17 connected to the valve 4. The block 15 is supported by a swinging link 18 connected by pin 19 to one corner of bell crank 20, which is pivoted by a pin 21 to the bracket 23 bolted to the frame 1. The other arm of bell crank 20 is connected by pin 24 to a link 25 which connects with the piston rod 26 of the "control cylinder" 27, by pin 24ᴬ. This control cylinder contains a piston 28, secured to rod 26, and a spring 29 is interposed between piston 28 and the control cylinder head 30. Mounted on the steam chest 3 is an ordinary throttling governor 31 driven by pulleys 32 and 33 and belt 34 from the engine shaft 35. A small pipe 36 having a valve 37 connects the steam chest 3 with the front end of the control cylinder 27 in such a manner that steam is admitted against the piston 28 on the side opposite spring 29. A steam pipe 38 having the usual stop valve 39 supplies steam to the engine.

The operation of this mechanism is, as follows: The engine is started in the usual way by opening valve 39. The valve 37 being also open, steam enters the control cylinder 27 by means of pipe 36 and drives the piston 28 back against the spring 29, and by means of the connecting parts depresses link block 15 to a certain point depending on the pressure of the steam admitted to the control cylinder. The position of the link block 15 in its slot determines the point of cut-off. When the link block 15 is in the extreme lower end of its slot the minimum cut-off is obtained, and when said block is in the extreme upper end of its slot the maximum cut-off is produced. The pressure of steam entering the steam chest will be varied by the governor 31 according to the changes of speed in the engine (and governor) produced by variations of load.

The function of the control cylinder is to vary the point of cut-off in a predetermined relation to the pressure of steam in the steam chest. This is accomplished by balancing these varying steam pressures against a spring of known resistance and deflection so that the rod 26 will act upon the link block 15, through the connecting parts, to give the valve 4 the desired cut-off for the pressure at that moment existing in the steam chest. For adjusting the mechanism to varying conditions of operation, I have shown a nut 41 and threaded end on link 18.

The spring end of the control cylinder is open to the atmosphere through the hole 30ᴬ. A small cock 40 may be placed in the other end of the control cylinder. If now the valve 37 be closed entirely and the cock 40 be opened the control cylinder will cease to be affected by the steam pressure from the steam chest, and the spring 29 will extend to its full limit and through the connecting parts raise the link block to its highest position giving the maximum cut-off to the valve. The engine will thus develop the greatest possible amount of power at a certain sacrifice of efficiency, producing a card similar to A Bᵃ C¹ C D A in Fig. 3. Upon closing the cock 40 and reopening the valve 37, the normal conditions of operation will be restored and the engine will produce cards similar to A B C D A, Fig. 3, and operate at maximum efficiency. The governor 31 is in sole control of the speed of the engine, and any disarrangement of the control cylinder 27 will in no wise affect the engine speed.

If by pulsations of steam in the steam chest the bell crank 20 and connected parts are caused to vibrate more than is desirable, this can be corrected by throttling the steam entering the control cylinder by means of the valve 37 until the desired degree of steadiness is obtained. It is not necessary to have a governor at all as the control cylinder in combination with a common throttle valve would produce the same results as to economy of steam.

The apparatus above illustrated is only one of many that might be used, but the method of obtaining the result is substantially the same in all cases.

The principle of this invention consists in governing the speed of the engine by varying the pressure of the entering fluid in the ordinary way, and then utilizing these changes of pressure to operate a device which automatically adjusts the point of cut-off to the pressure to be used.

For hoisting engines for mines and other uses and for reversing engines for rolling mill or similar service employing a manually operated throttle for control, the connecting pipe 36 to the control cylinder could be connected to the supply pipe 38 at any point between the throttle valve 39 and the engine. It is obvious that this arrangement could be used to operate almost any form of cut-off valve gear. I have shown in Fig. 4 an engine having its steam distribution effected by a single valve; had the engine been of the two or four valve type, the control cylinder 27 would be applied only to the cut-off valves. For Corliss engines, the control cylinder could be applied to operate the trips or knock off cams. For locomotives the control cylinder could be connected to the link in such manner as to produce the correct cut-off for the given pressure on both the forward and backward movements of the engine, although for practical purposes it would probably be sufficient to secure this action for forward running only. For steam locomotives it would be necessary to make some concessions to the requirements of the forced draft, in deciding on the exhaust pressure, but for compressed air locomotives using stored air, the method disclosed in my invention of expanding practically to atmosphere would be ideal, as every pound of force in the air could be utilized and the expansion carried down to atmospheric pressure at all times.

Figs. 5, 6, 7 and 8, illustrate a design for a compressed air motor according to my invention. The crank case 50 supports the crank shaft 51 in bearings 52, 53 and 54. The crank shaft 51 carries a fly wheel 55 and power is taken from the outer end 56 of the crank shaft 51. The cylinders 57 and 58 are mounted on the crank case. Each cylinder has its own piston 59 and connecting rod 60. Over the cylinder there is placed a combined cylinder head and valve case 61. This case carries rotary valves 62, one for each cylinder. These valves run in bushings 63 in which are formed suitable ports 64, 65 and 66, connected respectively with the inlet passage 67, the interior of the cylinders, and the exhaust port 68. Each valve is provided with two cavities 69, arranged diametrically opposite each other. The valves are driven by a valve shaft 70 fitted to slide freely through them, and having keys 71 engaging them.

Referring to Figs. 5 and 8, the left hand end of the valve shaft has a twisted square part 72; this is preferably formed by a milling process, the shaft being revolved as the milling cutter advances longitudinally thereof so as to form a helical surface. This part 72 of the valve shaft 70 is in effect a screw thread with a very long pitch. Around this screw end and loosely fitting the same is a bevel gear 73 mounted to rotate freely in a bearing 74 in line with the valve bushings 63, but held from endwise motion by the collars 75 and 76. Meshing with the bevel gear 73 is a bevel pinion 77 mounted at the upper end of a shaft 78 supported in the bearings 79 and 80. To the lower end of the shaft 78 is secured a miter gear 81, meshing with the miter gear 82 secured to the crank shaft 51. The miter gears 81 and 82 give an even drive so that the speed of shaft 78 is at all times exactly the same as the speed of the crank shaft 51. The bevel pinion 77 has just one-half the number of teeth of bevel gear 73 so that the speed of valve shaft 70 and valves 62 is at all times exactly one-half of the speed of the crank shaft. Mounted upon the vertical shaft 78 is the governor 83 having the weights 84 mounted on the bell cranks 85, and acting centrifugally to compress the spring 86 and move the sleeve 87 up and down on the shaft 78, and so impart motion to the lever 88 fulcrumed on the pin 89 and thus raise or lower the valve rod 90 which operates the governor valve 91. At the right hand side of the valve casings 61 is bolted the spring casing 92, to whose outer end is secured the control cylinder 93 containing the piston 94. At the inner end of the piston is the ball bearing collar 95 secured to the end of the valve shaft 70 by the nut 70ᵃ. The piston 94 is provided with a flange 94ᵃ which bears against the control spring 96, the other end of the spring bearing against the inner end of the spring casing 92. Fig. 8 shows the air inlet from the governor valve at 97 whence air passes into the manifold 98 and thence through the ports 64 into the cylinders. From the manifold 98 a small pipe 99 is led to a point in the control cylinder 93 in such position that air is admitted at the back of the piston 94 and causes the same to move in against the resistance of the spring 96. This pipe is provided with the three-way valve 100 having the straight-way port 101 and by-pass or relief port 102. This may be a common plug valve with an operating handle 103, which may be thrown by any convenient mechanism, as by the link 104. When the valve handle 103 and ports 101 and 102 are in the position shown on Fig. 8, the pressure in the control cylinder 93 back of the piston 94, is maintained practically equal to the pressure in the manifold 98 at all times. The area of the piston 94 and the resistance of the spring 96 are so proportioned relatively to each other in conjunction with the pressure to be used on the motor, that the proper point of cut-off, which the valves 62 are capable of producing, will be produced when the air pressure suitable to that cut-off exists in the manifold 98. The effect of moving the piston 94 is to slide the valve shaft 70 through the valves 62 and bevel gear 73, which action, owing to the peculiar construction of the end of the valve shaft 72 and the interior surface of the bevel gear 73, has the effect of changing the position of the valves rotatively with respect to the crank shaft and consequently, as will be readily understood, of varying the point of cut-off and making the same earlier or later depending on which way the valve shaft 70 is moved. The spring 96 must be so designed as to have an initial tension of an amount equal to the initial air pressure multiplied by the area of the piston 94, which will just balance these elements so that the point of cut-off will be maintained as long as the air pressure in the manifold 98 remains uniform. Any increment of pressure in the manifold 98, however slight, will cause the piston 94 to move out against the resistance of the spring 96, and as previously explained, will change the point of cut-off, making it earlier and earlier until the maximum pressure at which the motor is designed to run is reached. It will be understood, of course, that such an apparatus can be designed to work over any range of pressure; and Figs. 5, 6, 7 and 8 are merely introduced to show a carefully designed construction for a specific form of motor. It will be obvious that when handle 103 of the valve 100 is moved to the position shown in Fig. 11 the air in the control cylinder will be exhausted into the atmosphere and at the same time the entrance of more air from manifold 98 will be prevented so that the spring 96 will extend to its full amount, pulling the valve shaft 70 to its extreme inner position and fixing or locking the valve shaft 70 so that the point of cut-off will remain at the maximum until air is again admitted to the control cylinder 93.

In Fig. 8 I have illustrated means for shifting the valve 100 manually but it would be advantageous to do it mechanically and automatically. I have, therefore, shown in Figs. 9, 10 and 11 automatic means for throwing the valve 100 to produce the results above described, which may be operated by the governor when a sufficient change of speed occurs in the engine. The governor 83 operates the sleeve 87 as previously described and by means of the connecting parts raises or lowers the governor valve stem 90 to control the speed of the engine. The clevis 110 on the end of valve stem 90 is provided with lugs 111 which engage lugs 112 on bell crank 113. The bell crank 113 is fulcrumed on the pin 114 and connected at its lower end by pin 115 to link 104 which operates the valve 100 as previously described. Space is left on each side of lugs 111, between lugs 111 and lugs 112 so that the normal speed controlling action of the governor does not affect bell crank 113; that is, the governor has sufficient range to take care of ordinary changes of load without affecting the valve 100. However, if the valve 100 is open, as shown in Fig. 9 so as to put the point of cut-off under the control of cylinder 93 and an excessive load should come upon the engine, the effect would be to reduce the speed of the governor so that the weights 84 would assume position close to the sleeve 87 and depress the same, causing the lugs 111 to be raised and through the connecting parts to throw the valve lever 103 into the position shown in Fig. 11, so that the control cylinder 93 would cause the engine valves 62 to produce the maximum point of cut-off and allow the engine to develop its maximum power. As soon as the load lesssened and the governor gained speed the weights 84 would fly out, overcoming the resistance of the spring 86 and cause the lugs 111 to lower quickly, thus throwing the valve 100 into the position shown in Fig. 9 and restoring the normal operating condition with automatic variable cut-off to produce the maximum economy.

What I claim is:

1. A fluid pressure engine comprising in combination, means for regulating the pressure of the entering fluid, and means operated by pressure derived from fluid which has passed the first named means and arranged to vary the point of cut-off in such relation to the stroke as to permit expansion to be carried substantially to a uniform point before exhausting.

2. A fluid pressure engine comprising in combination, means for regulating the pressure of the entering fluid, and means operated by pressure derived from fluid which has passed the first named means and arranged to advance the point of cut-off on increase of pressure and delay the point of cut-off on decrease of pressure.

3. A fluid pressure engine comprising in combination, an automatic device for regulating the pressure of the entering fluid, and a supplementary device operated by pressure derived from fluid which has passed the automatic device and arranged to advance the point of cut-off on increase of pressure and delay the point of cut-off on decrease of pressure to thereby permit expansion to be carried to practically a uniform point before exhausting.

4. A fluid pressure engine comprising in combination, an automatic throttling governor controlling the speed of the engine and arranged to regulate the pressure of the entering fluid, and means operated by pressure derived from fluid which has passed the governor and arranged to vary the point of cut-off in such relation to the stroke as to permit expansion to be carried substantially to a uniform point before exhaustion.

5. A fluid pressure engine comprising in combination, an automatic throttling governor arranged to automatically regulate the pressure of the entering fluid to control the speed, and means actuated by pressure derived from fluid which has passed the governor and arranged to advance the point of cut-off on increase of pressure and delay the point of cut-off on decrease of pressure.

6. A fluid pressure engine comprising in combination, a throttling device arranged to control the pressure of the entering fluid, and a supplementary device arranged to vary the point of cut-off in fixed relation to variations of pressure, and means for rendering said supplementary device inoperative.

7. A fluid pressure engine comprising in combination, a throttling device arranged to control the pressure of the entering fluid, means operated by pressure derived from fluid which has passed the throttling device and arranged to vary the point of cut-off in fixed relation with variations of pressure, and means for rendering said last named means inoperative.

8. A fluid pressure engine comprising in combination, an automatic throttling governor arranged to control the pressure of the entering fluid, a supplementary device arranged to be acted on by fluid which has passed the governor and arranged to vary the point of cut-off with variations of pressure and means for rendering said supplementary device inoperative.

9. A governing mechanism for expansive fluid pressure engine comprising means for varying the pressure of the motive fluid admitted thereto according to the speed of the engine combined with means for varying the ratio of expansion in inverse relation to the pressure of fluid admitted by said first named means.

10. In a fluid pressure engine, a crankshaft, a cylindrical rotary valve having a plurality of cavities in its circumference, each of said cavities being adapted to effect the distribution of fluid for a single cycle of a single acting cylinder, and means for rotating the valve at a speed equal to unity divided by the number of cavities in the valve, multiplied by the speed of the crankshaft.

11. In a fluid pressure engine, a crankshaft, a continuously rotating cylindrical valve having a pair of diametrically opposite cavities in its circumference, each of said cavities being adapted to effect the distribution of fluid for a single cycle of a single acting cylinder, and means for rotating the valve at one half the speed of the crankshaft.

12. In a fluid pressure engine, a crankshaft, a rotary valve having a pair of diametrically opposite cavities in its circumference, means for rotating the valve at one half the speed of the crankshaft, and means whereby each of said cavities controls the admission, cut-off, exhaust, and compression of the working fluid during alternate revolutions of the crankshaft.

13. In a fluid pressure engine, a crankshaft, a rotary valve driven thereby having a plurality of cavities in its circumference, a casing surrounding said valve, an inlet port in said casing, a cylinder port in said casing, an exhaust port in said casing, and means whereby either of said cavities may first connect the inlet port and the cylinder port, and second, connect the cylinder port and the exhaust port.

14. In a fluid pressure engine, a crankshaft, a rotary valve, a valve shaft movable lengthwise through said valve and adapted to drive the same, and means for changing the angular position of the valve shaft with respect to the crankshaft to vary the point of cut-off.

15. In a fluid pressure engine, a rotary valve, a valve shaft movable lengthwise through said valve and adapted to drive the same, means for changing the angular advance of the valve by endwise motion of the valve shaft, and a controlling device operated by fluid pressure for controlling the endwise motion of the valve shaft.

16. In a fluid pressure engine having a plurality of cylinders, a regulated fluid-pressure supply, a rotary valve for each cylinder, a valve shaft movable lengthwise through said valves, and adapted to drive the same, means for varying the point of cut-off by endwise motion of the valve shaft, and a control cylinder operated by fluid pressure taken from the regulated supply to the cylinders for controlling the endwise motion of the valve shaft.

17. In a fluid pressure engine a power cylinder, a crank-shaft, a valve regulating the pressure of the entering fluid to said power cylinder, a rotary valve to effect the distribution of the fluid to and from the power cylinder, a valve shaft driven from the crankshaft and adapted to drive the valve and to change its angular relation to the crankshaft by an endwise movement, and a controlling device for said endwise movement of the valve shaft consisting of a control cylinder, a piston therein, a spring opposed to said piston, a connection between said piston and the valve shaft, and a pressure connection between said control cylinder and the regulated pressure supply.

18. In a fluid pressure engine, a regulated pressure supply, a rotary cut-off valve, mechanism for varying the point of cut-off, a stationary control cylinder containing a piston, a spring opposing said piston, a connection between said piston and said cut-off mechanism to vary the point of cut-off, and a pressure connection between the control cylinder and the regulated pressure supply.

19. A fluid pressure engine comprising in combination, a throttling device arranged to regulate the pressure of the entering fluid to control the speed of the engine, and a device operated solely by pressure derived from fluid which has passed the throttling device, for varying the point of cut-off in inverse relation to the pressure of the fluid which has passed the throttling device.

20. In a fluid pressure engine, means for regulating the pressure of the entering fluid to control the speed and means for changing the point of cut-off, the active elements in said latter means comprising the regulated fluid pressure and a spring acting in opposition thereto.

21. In a fluid pressure engine, means for varying the point of cut-off comprising fluid pressure taken from the source operating the engine and a spring, and means for protecting said spring against changes of external temperature.

22. In a fluid pressure engine, means for regulating the pressure of the entering fluid to control the speed, mechanism for changing the point of cut-off, a piston connected to said mechanism, a cylinder for said piston, a pipe admitting the regulated pressure to one side of said piston to move the same and a spring opposing the motion produced by said pressure.

22. A fluid pressure engine, comprising in combination an element for controlling the speed of the engine and a second element controlled solely by the first element, for varying the point of cut-off.

24. A fluid pressure engine comprising in combination, an element automatically actuated to control the speed of the engine and a second element controlled solely by the first element for varying the point of cut-off.

25. In a fluid pressure engine, means for varying the point of cut-off comprising fluid pressure taken from the source operating the engine, a spring, and means for inclosing said spring in a bath of said operating fluid.

26. In a fluid pressure engine, a throttling device arranged to regulate the pressure of the entering fluid to control the speed, cut-off controlling mechanism and means actuated solely by changes in the regulated pressure supply for actuating said cut-off controlling mechanism.

27. In a fluid pressure engine, a throttling device, cut-off controlling mechanism, a cylinder and its piston for actuating said cut-off controlling mechanism and a pipe leading directly from a point between the throttling device and the engine cylinder to said cut-off controlling cylinder.

28. In a fluid pressure engine provided with a plurality of cylinders, a valve for each cylinder, and a single fluid pressure operated means for changing the points of cut-off on all of said valves together.

29. A fluid pressure engine, comprising in combination an element for controlling the speed of the engine by regulating the pressure of the entering fluid and a second element controlled solely by the first element for regulating the quantity of fluid admitted to the cylinders at each stroke.

30. A fluid pressure engine, comprising in combination a pair of co-acting elements for controlling the entering fluid, one of said elements controlling the pressure of the entering fluid and the other controlling the quantity of fluid admitted to the cylinder and one of said elements being controlled solely by the action of the other.

WALTER W. MACFARREN.

Witnesses:
CHAS. ZODERMAN,
E. B. BRIANT.